United States Patent [19]

Sudo et al.

[11] Patent Number: 5,367,357
[45] Date of Patent: Nov. 22, 1994

[54] INSTANT PHOTOCOPYING APPARATUS

[75] Inventors: Hiroshi Sudo; Masanori Fujita; Tadahiko Yamaoka, all of Tokyo; Hajime Oda; Hiroaki Ishida, both of Chiba, all of Japan

[73] Assignee: Seikosha Co., Ltd., Tokyo, Japan

[21] Appl. No.: 140,332

[22] Filed: Oct. 18, 1993

Related U.S. Application Data

[63] Continuation of Ser. No. 875,850, Apr. 29, 1992.

[30] Foreign Application Priority Data

May 17, 1991 [JP] Japan ............... 3-034957[U]

[51] Int. Cl.⁵ .................................... G03B 27/52
[52] U.S. Cl. .......................... 355/27; 355/50; 355/71
[58] Field of Search ............ 355/50, 35, 38, 71, 355/27

[56] References Cited

U.S. PATENT DOCUMENTS

| | | | |
|---|---|---|---|
| 3,967,894 | 7/1976 | Tsilibes | 355/71 |
| 3,981,577 | 9/1976 | Tsilibes | 355/71 |
| 4,129,373 | 12/1978 | Ogura et al. | 355/1 |
| 4,193,679 | 3/1980 | Mochizuki et al. | 355/1 |
| 4,575,228 | 3/1986 | Rightmyre | 355/71 |
| 4,987,441 | 1/1991 | Hudspeth | |
| 5,164,763 | 11/1992 | Masanori et al. | |

Primary Examiner—Monroe H. Hayes
Attorney, Agent, or Firm—Jordan & Hamburg

[57] ABSTRACT

An instant photocopying apparatus has a rod lens array for imaging fine areas of a manuscript on a photosensitive surface of an instant film. The apparatus has a carrier which is movable in a direction parallel to the manuscript. A flourescent lamp illuminates the manuscript. A filter holder is mounted to the lower end of the carrier, and an optical filter is provided for covering a light incidence portion of the rod lens array. The filter is removably mounted so as to enable changing the exposure and tint of the photosensitive surface of the instant film by mounting or dismounting the filter.

8 Claims, 7 Drawing Sheets

INSTANT PHOTOCOPYING APPARATUS

This application is a continuation of application Ser. No. 07/875,850, filed Apr. 29, 1992.

BACKGROUND OF THE DEVICE

1. Field of the Invention

The present device relates to an instant photocopying apparatus for copying manuscripts, originals and pictures, etc.

2. Background of the Invention

One instant photocopying apparatus for copying objects such as manuscripts, pictures and originals, uses an instant film which is provided with a photosensitive surface and a printing surface for forming a reverse image of the image imaged on the photosensitive surface as a visible image (disclosed in Japanese Patent Application No. 1-331317 and others).

However, sensitivity (ISO value) of a usable instant film is predetermined when brightness (luminance) of a light source for illumination such as a fluorescent lamp and a reading speed are constant, so that films having higher sensitivity cannot be used. For example, when brightness of a light source for illumination and scanning speed are adjusted for an ISO 100 color film, an ISO3000 monochrome film is overexposed, if it is used, and copies having the optimum quality cannot be obtained since its sensitivity is too high. Moreover, since color films have more or less different spectral characteristics depending on each item and maker, it is difficult to reproduce the same color in those films with a limited illuminating light source.

SUMMARY OF THE DEVICE

Accordingly, it is an object of the present device to overcome the aforementioned problem by providing an instant photocopying apparatus that can accommodate instant photosensitive materials having different exposure characteristics, regardless of whether the materials have high sensitivity or not, to always finely copy objects.

In order to achieve the aforementioned object, the instant photocopying apparatus of the present device is provided with an illuminating means for illuminating an object, an optical means and an optical filter. The optical means is provided in a manner capable of moving parallel to the object and allows imaging of fine areas of the object one after another on a photosensitive surface of an instant photosensitive material while moving in parallel. The optical filter changes the exposure characteristics of the photosensitive surface of the instant photosensitive material and is positioned on at least one optical path among optical paths between the illuminating means and the object, between the object and the optical means and between the optical means and the photosensitive surface of the instant photosensitive material. The optical filter is provided in a manner capable of being exchanged or switched on the optical path to change the exposure characteristics of the photosensitive surface of the instant photosensitive material.

The optical filter may be a color filter for correcting color or a light-reducing filter to be able to accommodate with the exposure characteristics of photosensitive surface of the instant photosensitive material and to copy the object more finely. The color filter for correcting color may be one having a plurality of color filters having different light transmitting characteristics and those color filters may be provided in a manner capable of being selectively switched on respective optical paths.

According to the present invention, exposure and tint may be adjusted corresponding to the exposure characteristics of the instant photosensitive material and the object may be copied finely even if instant photosensitive materials having different exposure characteristics are used, by connecting/disconnecting or switching the optical filters.

The above and other advantages of the present device will become more apparent in the following description and the accompanying drawings.

BRIEF DESCRIPTION OF THE DRAWINGS

In the foregoing drawings, like reference numerals designate like or corresponding parts throughout several views.

DETAILED DESCRIPTION OF PREFERRED EMBODIMENT

Figure 1:
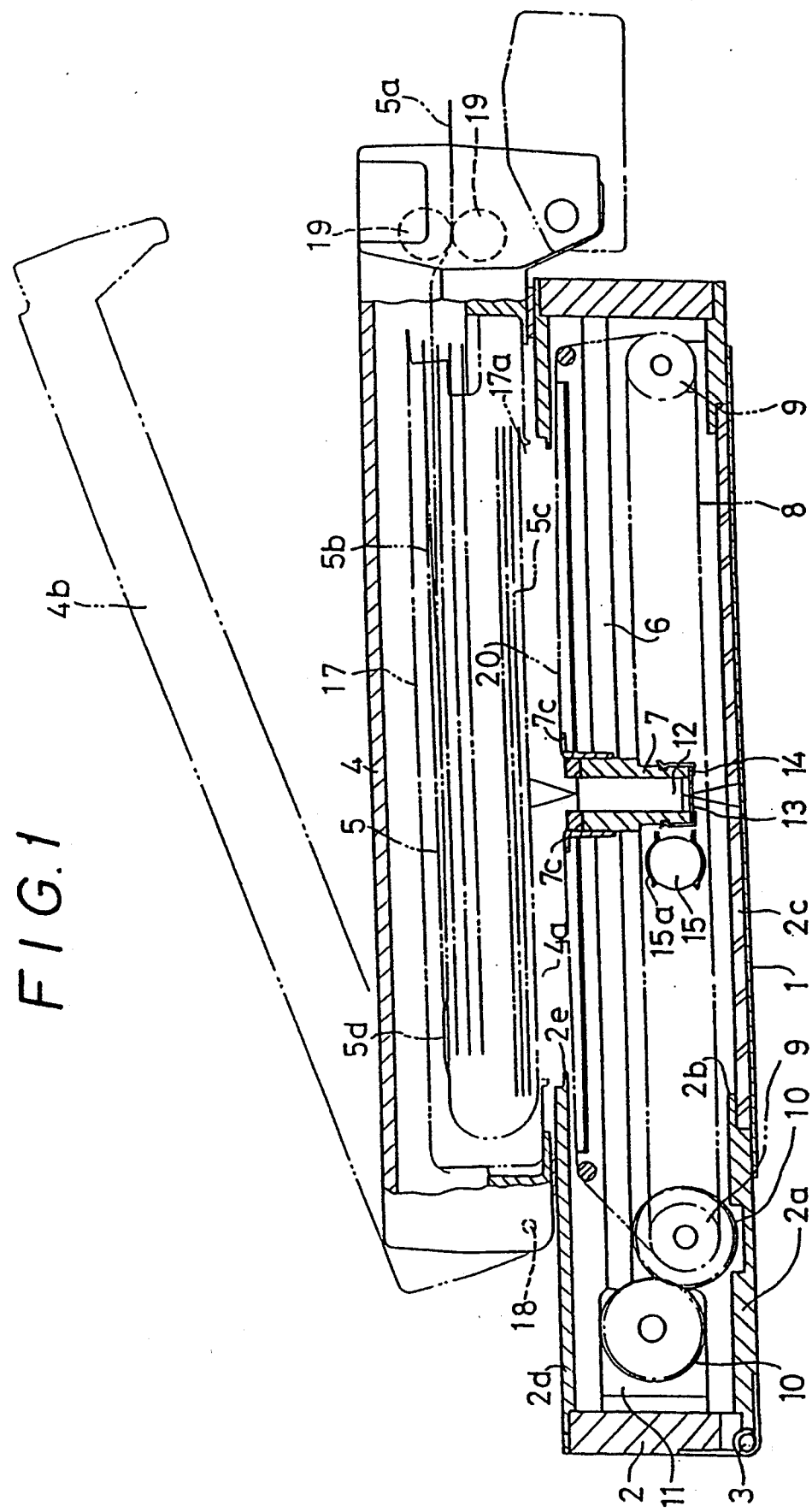
FIG. 1 is a longitudinal section view of an apparatus of the present device.

Referring now to the drawings, preferred embodiments of the present device will be explained.

In FIG. 1, a case 2 which is placed on a manuscript 1, an object, is made from a light blocking material and a base plate 2a is mounted at the base of the case 2 turnably centering on a hinge 3. A window 2b which allows seeing through the manuscript 1 is formed on the base plate 2a and a transparent plate 2c is secured to the window 2b forming one surface with the bottom surface of the base plate 2a.

An opening 2e is formed on an upper plate 2d of the case 2 in a position relationship facing the window 2b of the base plate 2a. Mounted on the case 2 is a cassette holder 4 which is provided with an opening 4a that faces the opening 2e at the bottom surface and which contains an instant film 5, i.e. an instant photosensitive material.

Figure 3:
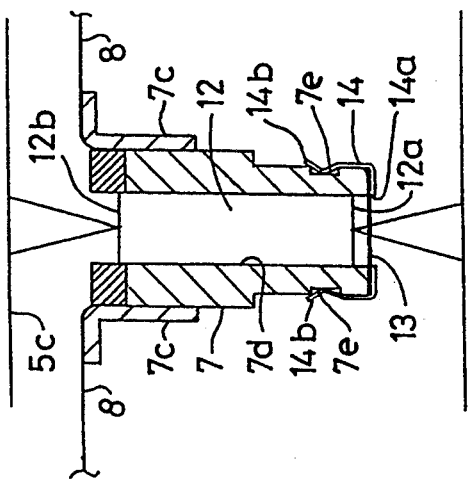
FIG. 3 is a enlarged section view illustrating a state when the filter holder is mounted to the carrier.
Figure 2:
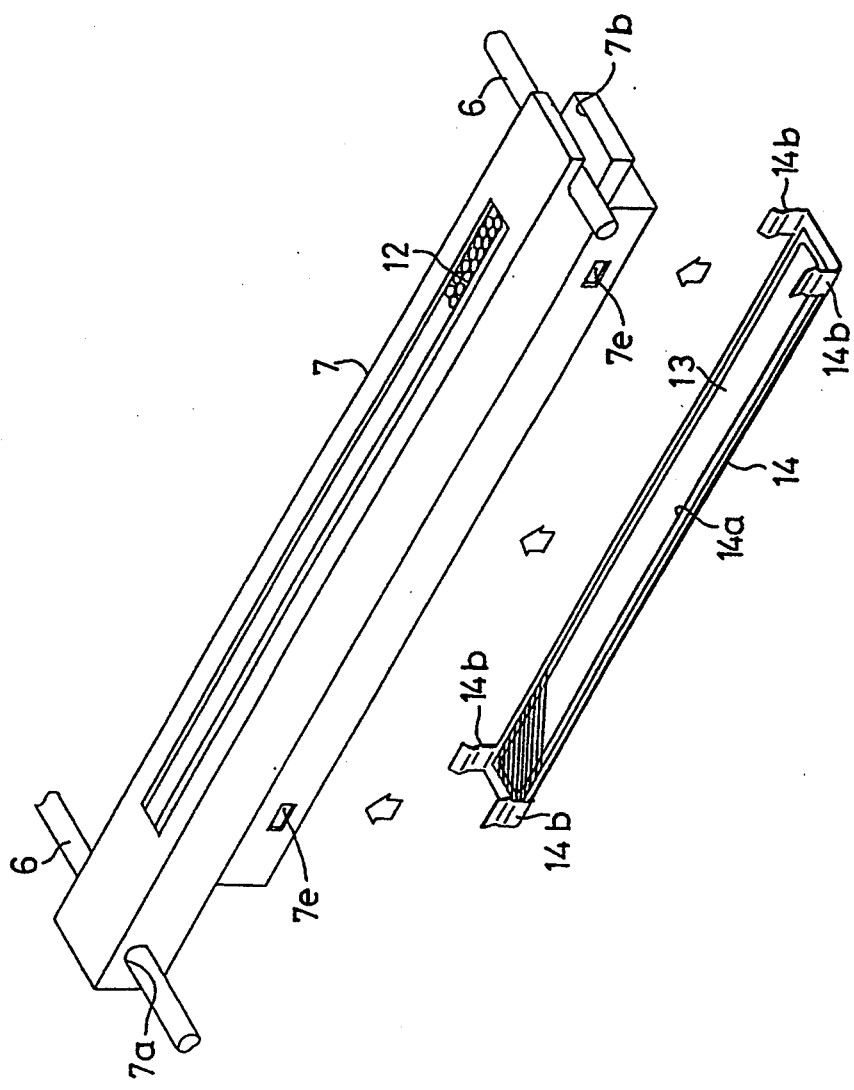
FIG. 2 is a perspective view illustrating a carrier and a filter holder of the present device.

In FIGS. 1 through 3, a pair of guide shafts 6 are provided at both side portions within the case 2 in parallel to the bottom surface of the case 2 and both guide shafts penetrate a hole 7a and a U-shaped groove 7b which are provided at both end portions of a carrier 7. Part of an endless timing belt 8 is mounted to the carrier 7 through a securing means (not shown). The timing belt 8 is wound up by pulleys 9 pivoted to bearings (not shown) and the pulleys rotate interlocking with rotation of a driving motor 11 fixed to the case 2 through the intermediary of gear trains 10. Therefore, the carrier 7 may be reciprocated and may be moved in parallel along the manuscript 1 by being guided by the guide shafts 6 by rotating the driving motor 11 forwardly and reversely. The moving range of the carrier 7 is limited by a limit switch (not shown) provided within the case 2.

An elongated groove 7d is formed in the middle portion of the carrier 7 and a rod lens array 12 (e.g. Selfoc lens array: product name) is held within the elongated groove 7d. The rod lens array 12 has a predetermined projection range the same as normal lenses and is an optical means for imaging fine areas of the manuscript 1 which contact the bottom surface of the transparent plate 2c to the photosensitive surface 5c of the instant film 5 as an erecting real image through a light incidence portion 12a and an imaging portion 12b.

One end of a shading film 20 is secured to both ends of the carrier 7 through the intermediary of retainers 7c. The other ends of the shading film 20 are wound up by winding shafts (not shown) by the urging force of springs (not shown). It is wound up or unwound along the movement of the carrier 7 to shade the photosensitive surface 5c of the instant film 5 except for the projecting portion of the rod lens array 12.

As shown in FIGS. 2 and 3, a filter holder 14 in which an optical filter 13 is mounted is removably provided at the bottom end portion of the carrier 7. For the optical filter 13, a light-reducing filter or a color filter for correcting color for example may be used. The filter holder 14 is formed into a long plate shape and has a rectangular window 14a in the middle portion thereof. The window 14a is covered by the optical filter 13 from above. A pair of engaging members 14b are formed extending upwardly from both sides of the filter holder 14. The upper end portion of each engaging member 14b is bent in dogleg-shape toward the inside. The engaging members 14b removably engage engaging grooves 7e formed on both side surfaces of the lower part of the carrier 7 as shown in FIG. 2. When the filter holder 14 is mounted to the carrier 7, the light incidence portion 12a at the bottom of the rod lens array 12 is covered by the optical filter 13.

Accordingly, since the filter holder 14 is removably mounted to the carrier 7, the optical filter 13 may be changed to one that appropriately accommodates the exposure characteristics of the instant film 5.

Moreover, as shown in FIG. 1, a fluorescent lamp 15 serving as an illuminating means is mounted to the carrier 7 through the intermediary of a supporting plate 15a. A slit-shaped aperture is provided at the circumference of the fluorescent lamp 15 at a position which faces to the upper surface of the manuscript 1 at the lower part of the rod lens array 12 to increase the illumination of the fine areas of the manuscript 1 to be copied. The light from the fluorescent lamp 15 enters the light incidence portion 12a of the rod lens array 12 by being reflected from the manuscript 1 and is imaged on the instant film 5 going through the imaging portion 12b.

The cassette holder 4 is made from a material which blocks light. An upper cover 4b is provided on the cassette holder 4 for inserting and taking out a film cassette 17 and is turnably supported by a hinge 18 which is fixed to one end portion of the cassette holder 4.

The instant film 5 is stored in the film cassette 17 which is mounted to the cassette holder 4. The rear end portion of a pull out tongue member 5a of the instant film 5 is forked into branches. A printing surface 5b and the photosensitive surface 5 are secured to each end portion facing each other and developer 5d which is contained in a package is mounted to the other end. A plurality of instant films 5 are stored in the film cassette 17 and the photosensitive surface 5c of the instant film 5 at the bottom is exposed from an opening 17a opened on the bottom surface of the film cassette 17 to face to the window 2b on the base plate 2a. The package in which the developer 5d is contained is broken when the pull out tongue member 5a is pulled out by passing it through a pair of rollers 19 mounted to the cassette holder 4. Then the developer is applied between the printing surface 5b and the photosensitive surface 5c, thereby developing and fixing the instant film 5.

In operation, the base plate 2a of the case 2 is opened pivoting on the hinge 3 and the filter holder 14 in which an optical filter 13 which accommodates with exposure characteristics of the instant film 5 is mounted beforehand is mounted at the lower end portion of the carrier 7 to cover the light incidence portion 12a of the rod lens array 12 by the optical filter. The base plate 2a is then closed. The carrier 7 is set at the stand-by position at the left side in FIG. 1 to position the light incidence portion 12a of the rod lens array 12 at the outside of the opening 2e. The case 2 is lifted up together with the cassette holder 4 by rotating pivoting on the hinge 3. Then the position of the manuscript 1 to be copied is confirmed seeing through the window 2b so that it is positioned within the window 2b and the case 2 is placed on the manuscript 1 so that the photosensitive surface 5c of the instant film 5 becomes parallel to the manuscript surface.

When a power switched is pressed, the fluorescent lamp 15 lights up and illuminates the lower part of the rod lens array 12. When an activating switch is also pressed, the driving motor 11 starts up and advances the carrier 7 toward the right direction from the stand-by position at the left end through the intermediary of the gear trains 10, the pulleys 9 and the timing belt 8. Then, along the advancement of the carrier 7, reflected lights from the upper surface of the manuscript 1 enter the rod lens array 12 one after another and a latent image is formed by being imaged on the photosensitive surface 5c of the instant film 5. When the carrier 7 reaches to the right end position and the latent image is formed on the whole surface of the photosensitive surface 5c of the instant film 5, the limit switch (not shown) is activated to stop the carrier 7, thereby ending one operation.

Then when the pull out tongue member 5a of the instant film 5 is pulled out, the developer 5d is applied between the printing surface 5b and the photosensitive surface 5c, completing development in about 1 minutes, for example.

When another manuscript is to be copied, the activation switch is pressed again and the carrier 7 is advanced from the right end position to the left end position to copy in the same manner as described above.

Although the filter holder 14 has been removably mounted to the carrier 7 to be able to change the types of the optical filter 13 in accordance to exposure characteristics of the instant film 5 in the aforementioned embodiment, it is also possible to removably provide the optical filter 13 in the filter holder 14.

To correct color tone of the instant film 5 and to obtain copies always having the same tint, a color filter may be used as the optical filter 13 which is adjusted to the color tone of the instant film 5.

Figure 4:
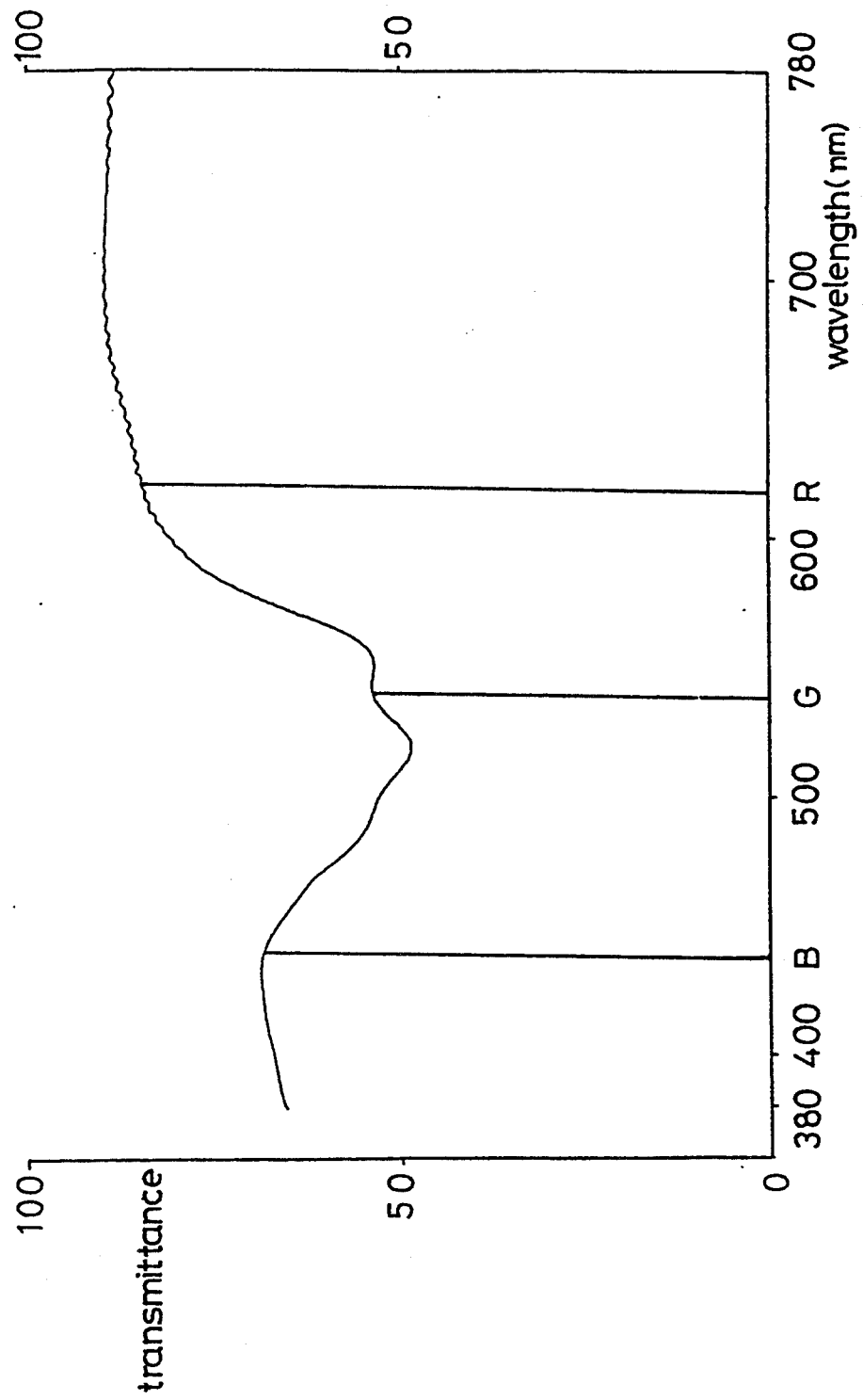
FIG. 4 is a chart illustrating a spectral characteristic of an optical filter.
Figure 5:
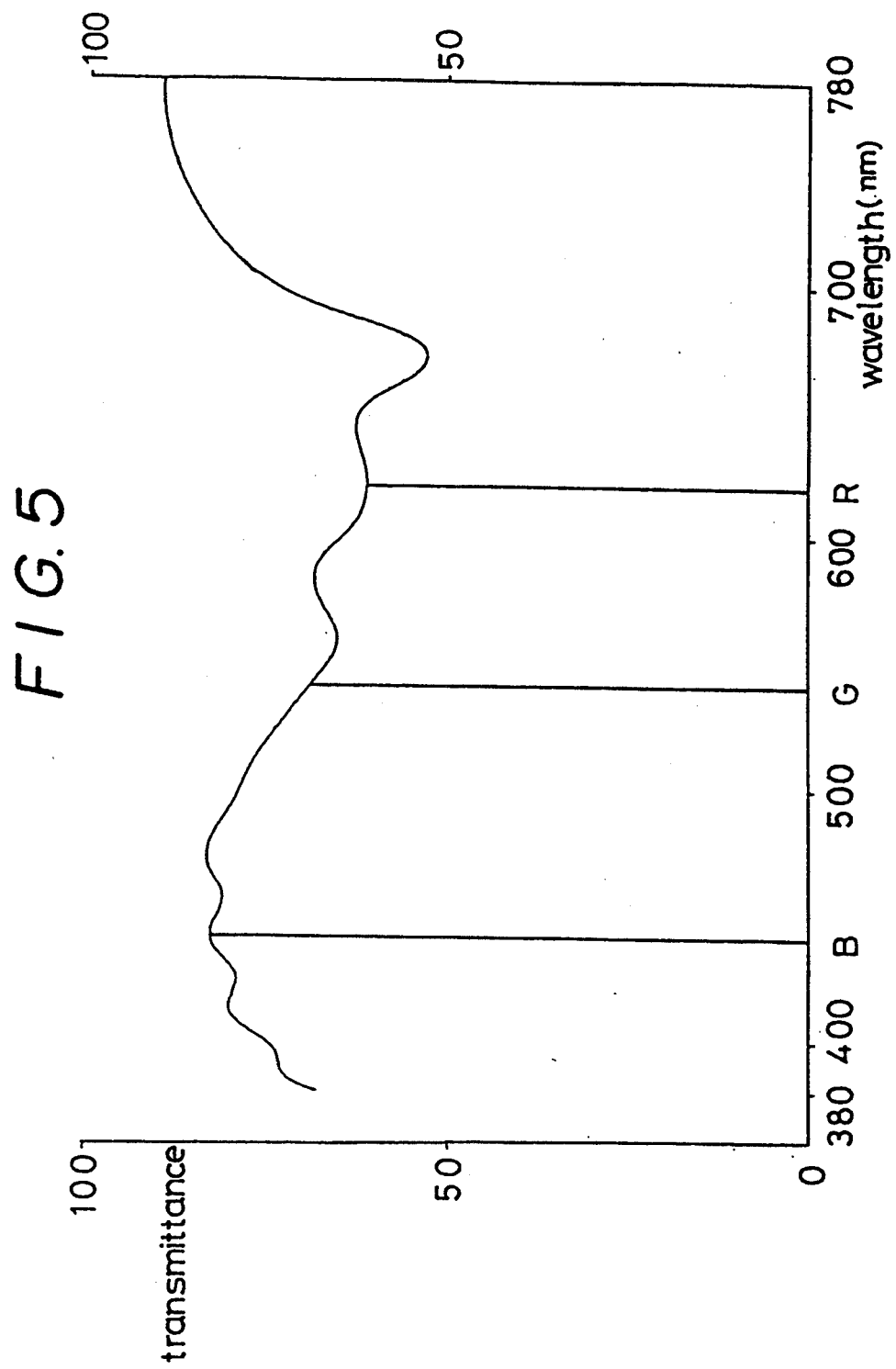
FIG. 5 is a chart illustrating a spectral characteristic of another optical filter.

FIGS. 4 and 5 illustrate spectral characteristics of color filters. FIG. 4 illustrates spectral characteristics of a color filter suited for stressing skin color when copying a picture in which people is photographed. In the color filter, transmission factors of blue (B) and green (G) are set low and that of red (R) is set relatively higher than those of blue (B) and green G). Accordingly, when an instant film 5 which is difficult to bring out skin color is used, it is appropriate to use the foregoing color filter as the optical filter 13.

FIG. 5 illustrates spectral characteristics of a color filter suited for stressing blue and green when a picture in which a landscape is photographed is copied. In the color filter, transmission factor of red (R) is set low and those of blue (B) and green (G) are set relatively higher than that of red (R). Accordingly, when an instant film which is difficult to bring out blue and green, though it brings out skin color finely, is used, it is appropriate to change the former color filter to the later color filter.

Although the filter holder 14 is removably mounted to the light incidence portion 12a of the rod lens array 12 and the optical filter 13 is positioned on the optical path between the manuscript 1 and the rod lens array 12 in the aforementioned embodiment, it is possible to removably mount the filter holder 14 to the imaging portion 12b of the rod lens array 12 and to position the optical filter 13 on the optical path between the rod lens array 12 and the instant film 5.

Moreover, although the optical filter 13 is removably mounted in the aforementioned embodiment, a plurality of optical filters may be disposed in a manner capable of being switched around the illuminating means as described below.

Figure 6:
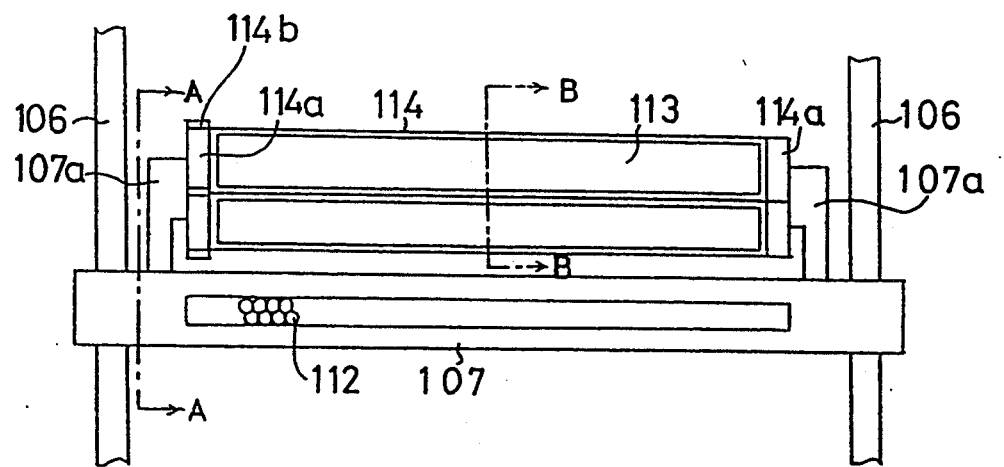
FIG. 6 is a plan view of a main part illustrating another preferred embodiment.
Figure 7:
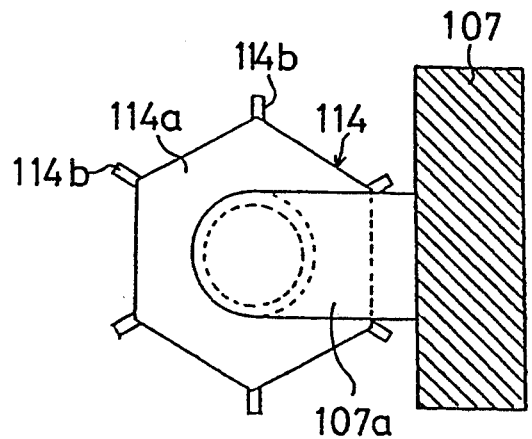
FIG. 7 is an enlarged section view taken along A—A line in FIG. 6.
Figure 8:
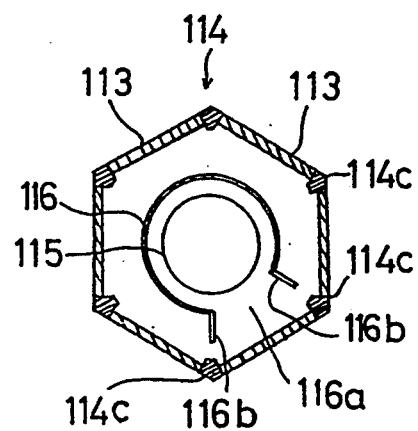
FIG. 8 is an enlarged section view taken along B—B line in FIG. 6.

In the preferred embodiment shown in FIGS. 6, 7 and 8, side plates 114a of a cylindrical filter holder 114 having a hexagon-shaped section is turnably supported between arms 107a that extend from a carrier 107. A projection portion 114b for manipulation is provided at each angular portion of the side plate 114a. An optical filter 113 is provided on each surface on the circumference of the filter holder 114, and one of the optical filters is constructed by a transparent member to be as a neutral position. Disposed in the shaft center portion of the filter holder 114 is a reflecting plate 116 which surrounds a fluorescent lamp 115 and its surrounding part whose both ends are fixed to the arms 107a. Although the reflecting plate 116 covers the surrounding part of the fluorescent lamp 115, a part of it is opened as an opening 116a and a click mechanism (not shown) is provided so that the filter holder 114 stops when each optical filter 113 comes to a position which faces to the opening 116a. Shading plates 116b of the reflecting plate 116 are provided around the opening 116a to block lights that passed through optical filters other than a desired optical filter 113 from reaching to the manuscript surface. In the figure, the reference numeral 106 denotes guide shafts for guiding the carrier 117.

Switching of the optical filters 113 is carried out by turning the filter holder 114 by the projection portions 114b to cause a desired optical filter 113 to face the opening 116a.

By the way, the shading plates 116b may be elongated from the inside of the holder portion 114c of the filter holder 114 to the opening 116a.

Figure 9:
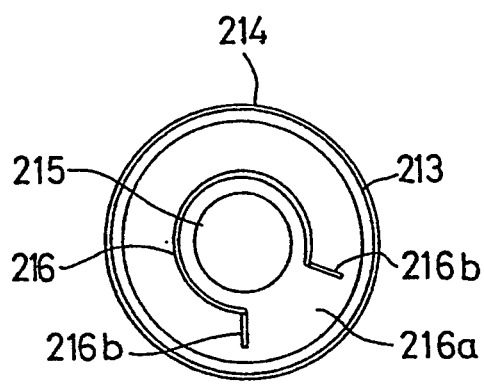
FIG. 9 is an enlarged section view of the optical filter and the filter holder of further another embodiment.

Another embodiment will be explained referring to FIGS. 9 and 10.

In this embodiment, although the shape of a filter holder 214 and an arrangement of an optical filter 213 are different from the embodiment shown in FIGS. 6 through 8, other arrangements are substantially the same as in the embodiment in FIGS. 6 through 8. The filter holder 214 is formed in a cylindrical shape and is freely turnable around a fluorescent lamp 215 and a reflecting plate 216 within it. An optical filter 213 in which three types of filters 213a, 213b and 213c having different filtering characteristics as developed and shown in FIG. 10 are disposed in a pattern so that ratio of their areas sequentially changes is mounted to the filter holder 214. Every filters 213a through 213c are constructed by members for improving coloring characteristics of the fluorescent lamp 215. The filter 213a may be a transparent member.

According to this embodiment, though a normal fluorescent lamp has strong blue brightness and red and green are weak, when the filter 213a is transparent and the filter 213b is set to green and the filter 213c is set to red and when the filter holder 214 is turned, the tint may be adjusted continuously from strong green (E1) to moderate green (E2) and further from neutral (E3) to moderate red (E4) and strong red (E5). It is appropriate to set the right tint in the neutral zone (E3).

Figure 10:
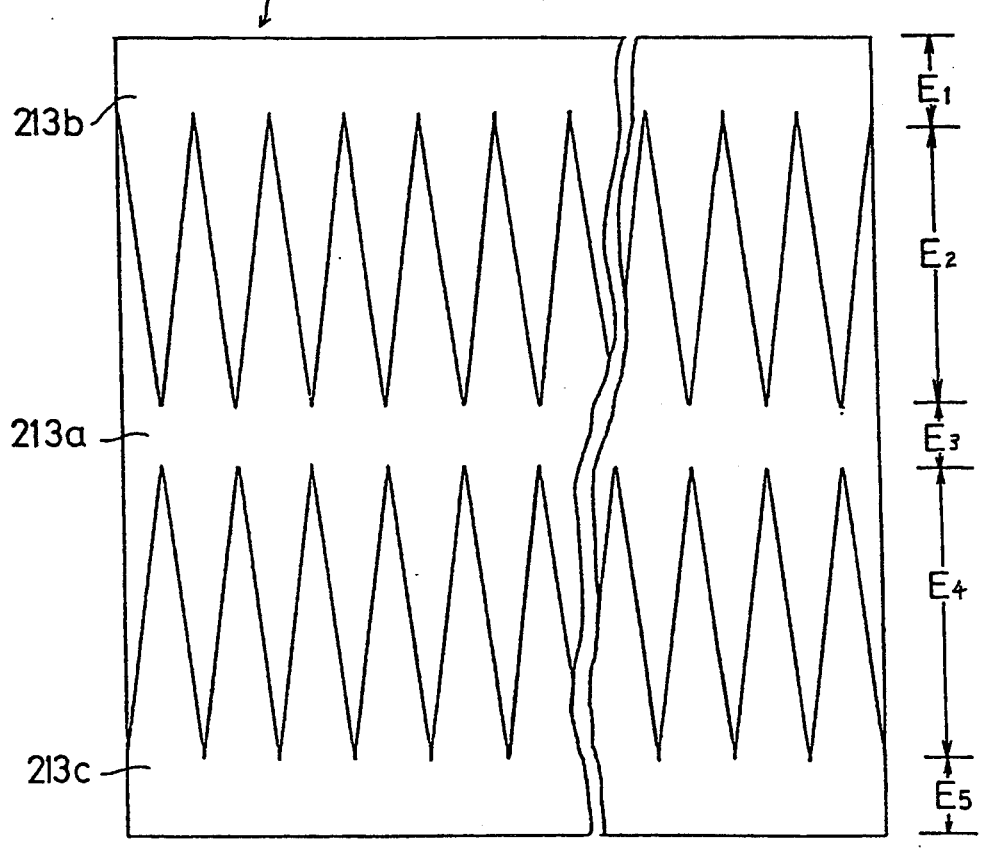
FIG. 10 is a development of the optical filter shown in FIG. 9.

The optical filters 213 are not limited to the embodiment in FIG. 10, and concentration of color of each filter may be also changed.

Figure 11:
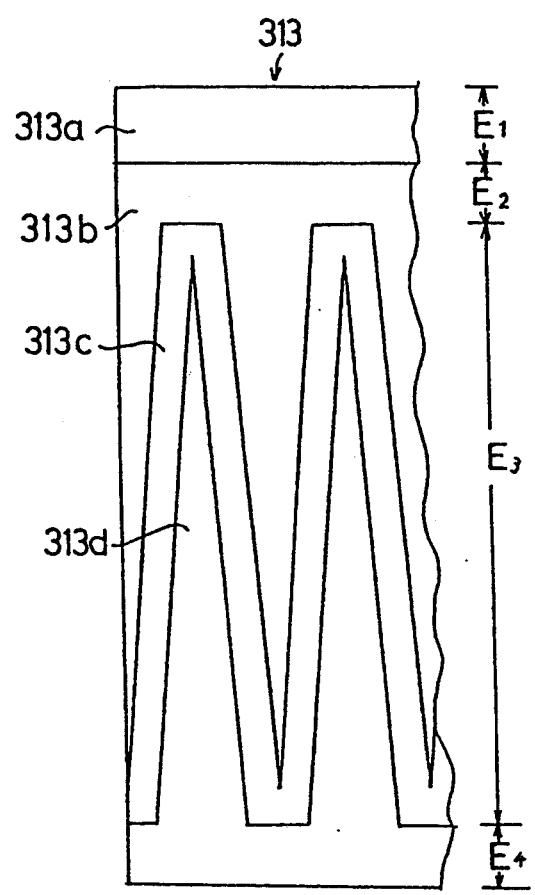
FIG. 11 is a development illustrating further another embodiment of the optical filter.

Moreover, it is possible to change the ratio of areas of other optical filters 313b and 313d having different characteristics while keeping an area of a particular optical filter 313c constant in optical filters 313 shown in FIG. 11. A filter 313a is the neutral position and is transparent portion.

In order to readily switch the optical filters, an opening may be opened partially at a portion where the carrier is covered at the stand-by position of the end portion of the carrier on the base plate 2a to provide a cover for opening and closing them. It is also possible to provide a sequence for moving the carrier at a position where the optical filters may be turned and manipulated.

As described above, according to the present invention, the optical filter may be selected in accordance to exposure characteristics of the instant film, so that a light amount that matches to the instant film may be obtained and the optimum light amount balance may be obtained even for a high sensitive film, thereby allowing to copy finely. The use of a color filter for correcting color matched to color tone of the instant film as the optical filter allows to correct the color tone of the instant film and to obtain copies having always similar tint.

As many apparently widely different embodiments of this device may be made without departing from the spirit and scope thereof, it is to be understood that the device is not limited to the specific embodiments thereof except as defined in the appended claims.

What is claimed is:

1. An instant photocopying apparatus, comprising:
   illuminating means for illuminating an object;
   an instant film disposed in an instant film cassette, said instant film having a photosensitive surface and a printing surface for forming a reverse image of the image imaged on the photosensitive surface as a visible image and wherein the instant film has different exposure characteristics, said instant film including a developer which is applied between said photosensitive surface and said printing surface to thereby develop and fix the instant film;

optical means mounted to be movable in parallel to said object for imaging fine areas of said object on said photosensitive surface of said instant film and forming an image thereon;

an optical filter positioned on at least one optical path among optical paths between said illuminating means and said object, between said object and said optical means and between said optical means and said photosensitive surface of said instant film for changing exposure characteristics of said photosensitive surface of said instant film; and said optical filter being removably mounted in said optical path.

2. An instant photocopying apparatus according to claim 1 wherein said optical filter is a color filter for correcting color.

3. An instant photocopying apparatus according to claim 1 wherein said optical filter is a light-reducing filter.

4. An instant photocopying apparatus, comprising:

a case having a document plane adapted to be positioned on a document to be copied;

illuminating means in said case for directing light toward said document plane;

an instant film disposed in an instant film cassette, said instant film having a photosensitive surface and a printing surface for forming a reverse image of the image imaged on the photosensitive surface as a visible image and wherein the instant film has different exposure characteristics, said instant film including a developer which is applied between said photosensitive surface and said printing surface to thereby develop and fix the instant film;

said instant film cassette being mounted on said case and having an image plane, said instant film cassette comprising means for holding said instant film in said image plane;

optical means mounted in said case and movable in a direction parallel to said object, said optical means imaging determined areas of said document plane on said image plane;

whereby light from said illuminating means is directed in a path extending from said illuminating means, reflected from a document at said document plane, and imaged on said instant film at said image plane via said optical means; and an optical filler removably mounted in said case in said path.

5. The apparatus of claim 4 wherein said optical filter is mounted between said illuminating means and said document plane.

6. The apparatus of claim 4 wherein said optical filter is mounted between said document plane and said optical means.

7. The apparatus of claim 4 wherein said optical filter is mounted between said optical means and said image plane.

8. The apparatus of claim 4 wherein said optical means comprises a carrier and means for moving said carrier in a direction parallel to said document plane, said filter being removably mounted to said carrier.

* * * * *